Figure 3:
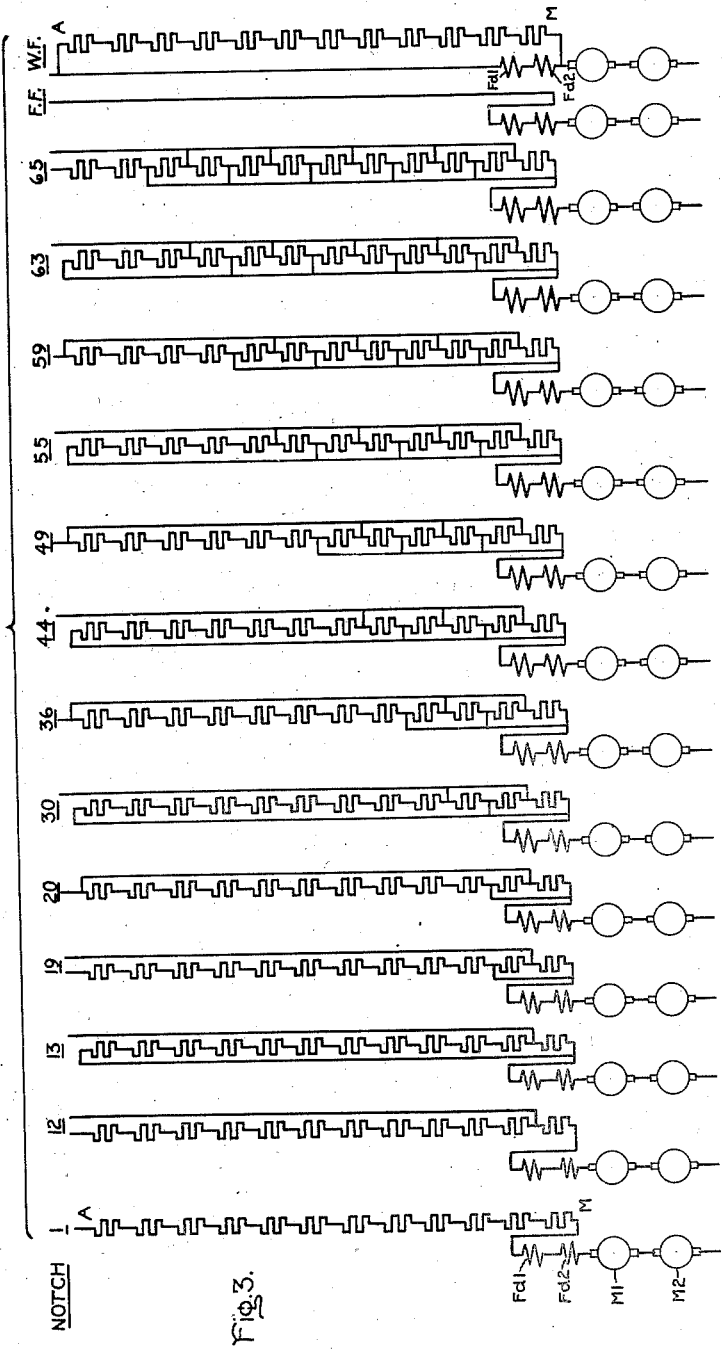

Sept. 27, 1938.    W. T. GRAY    2,131,588
ELECTRIC MOTOR CONTROL EQUIPMENT
Filed Jan. 25, 1937    5 Sheets—Sheet 1
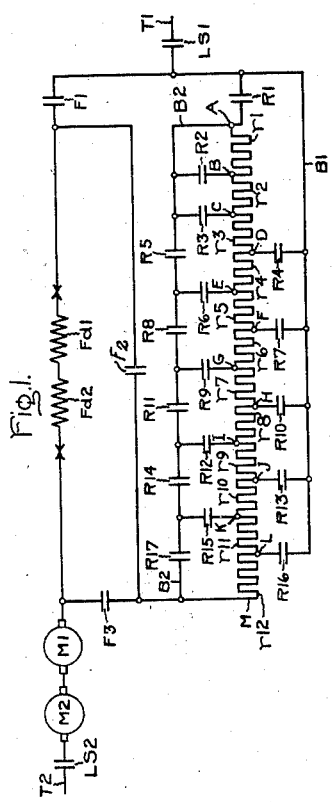
Inventor:
William T. Gray,
by Harry E. Dunham
His Attorney.

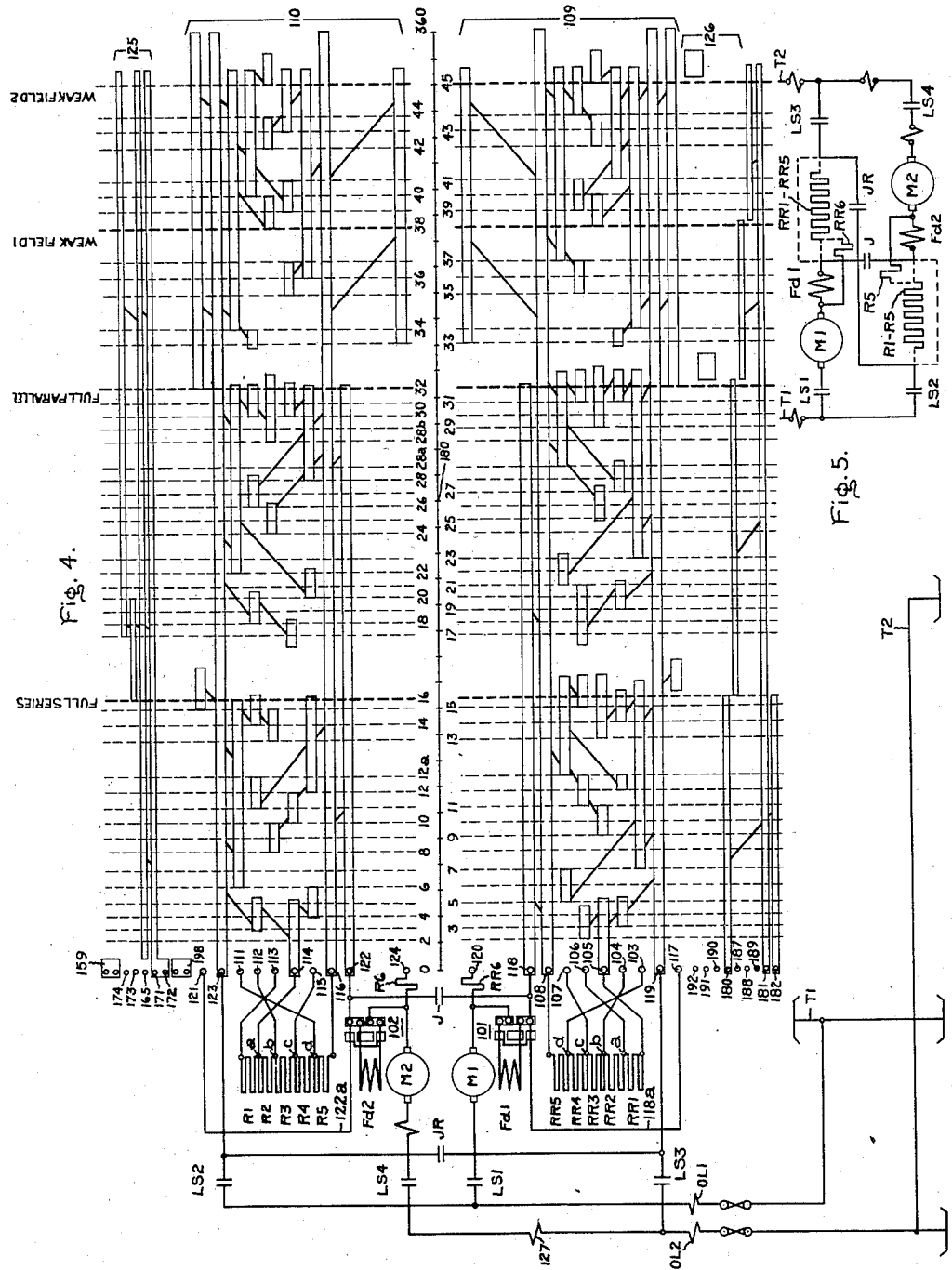

Sept. 27, 1938.  W. T. GRAY  2,131,588
ELECTRIC MOTOR CONTROL EQUIPMENT
Filed Jan. 25, 1937   5 Sheets-Sheet 4

Inventor:
William T. Gray,
by Harry E. Dunham
His Attorney.

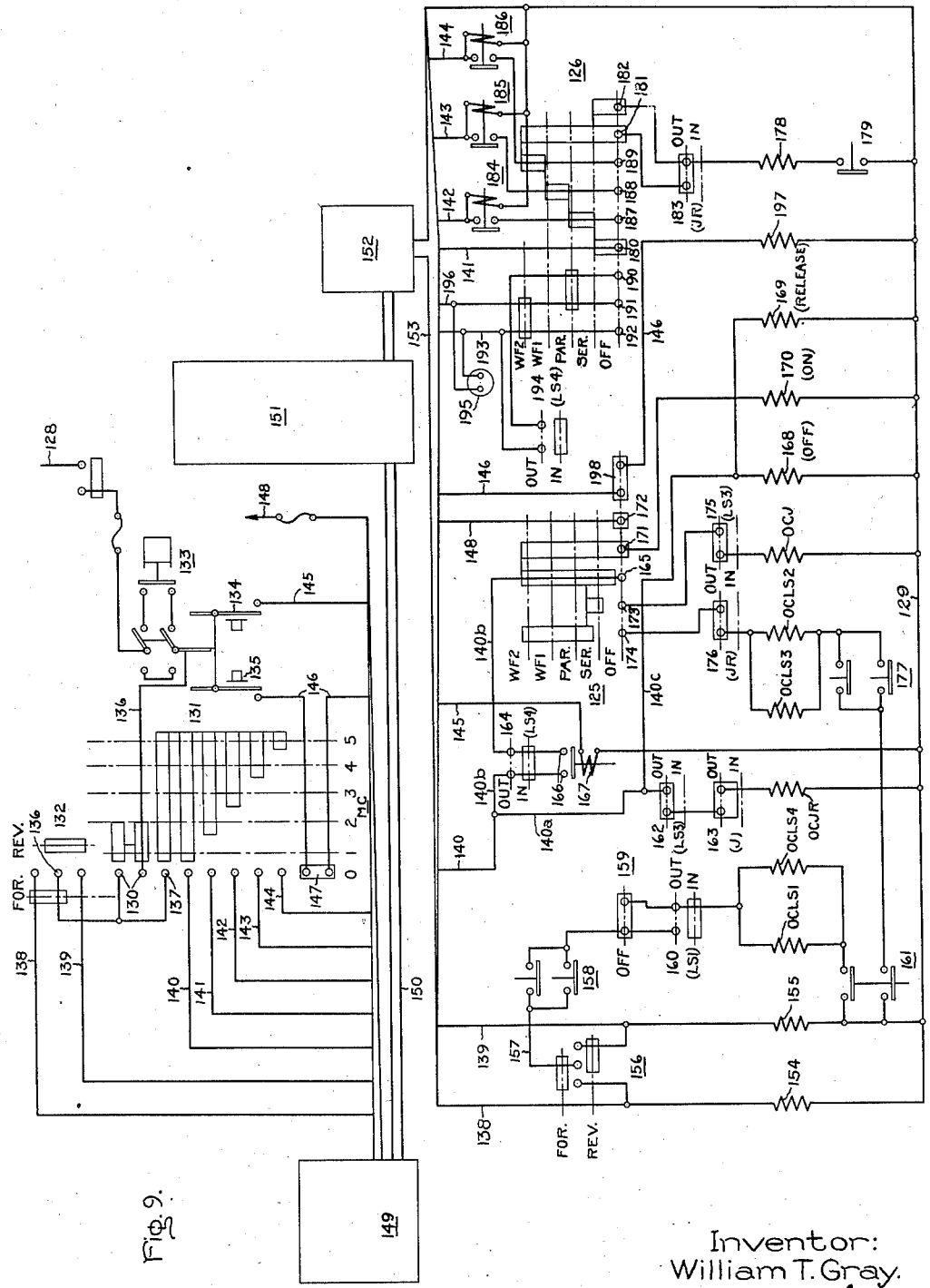

Patented Sept. 27, 1938

2,131,588

UNITED STATES PATENT OFFICE 2,131,588

ELECTRIC MOTOR CONTROL EQUIPMENT

William Train Gray, Altrincham, England, assignor to General Electric Company, a corporation of New York Application January 25, 1937, Serial No. 122,286
In Great Britain February 3, 1936

10 Claims. (Cl. 172—179)

This invention relates to control equipments for electric motors having series field windings, of the kind in which during acceleration resistance is progressively cut out of the motor circuit and thereafter the field windings are shunted in order to weaken the motor fields. The invention has for its object to provide a particularly advantageous control equipment of this kind in which a large number of accelerating notches is obtainable, the accelerating resistance being finely variable, and also the degree to which the field is weakened being finely variable. The invention is particularly, but not exclusively applicable to control systems for electric traction motors.

According to the invention a control equipment of the kind specified comprises a resistance divided into a number of sections adapted to be inserted in the armature circuit and switching means which, in response to actuation or movement of a control element for causing acceleration of the motor, initially places said resistance in series with the armature and series field winding of the motor, first in a single path connection and subsequently in a series of multiple path connections. The switching means is further arranged so that in order to obtain further acceleration by weakening the field of the motor, said resistance or part thereof is connected in parallel with the series field winding or a part thereof and then reduced progressively by a sequence partly or wholly in accordance with the previous sequence by which the resistance is removed from the armature circuit.

The switching means may be of any desired form and may be controlled by any desired type of controller. As shown, the switching means comprises a drum controller operated automatically or, as shown, the switching means may comprise electromagnetically actuated contactors the controlling circuits of which are operated from a sequence switch.

The invention further contemplates the use of a resistor comprising a number of series connected sections with lateral tapping connections passing via a switch in each to a bus wire, and a second series of lateral tappings intercalated with the first series, also passing via individual switches to a second bus wire, which is broken by further switches, between successive tappings or between some of the latter, the arrangement being such that by a graduated sequence of tap-stepping and of interconnecting of tappings the effective value of resistance imposed upon the circuit by the resistor may be varied from that corresponding to a single path through the series of resistor elements, down to that involved by a multiple connection of the load circuit to a plurality of tappings together with a similar multiple connection of the power supply line to a plurality of other tappings intercalated with the first. The said switches may for example be separate switch devices such as contactors or may be constituted by suitably arranged contacts of a drum type or like controller, the two bus wires in the latter case being conveniently constituted by connections between appropriate contact segments on the controller drum or the like.

Where a drum type switch is employed the contact fingers of said switch are divided into two groups of adjacent fingers associated respectively with the two sets of alternate tappings of the resistance, and the connection between one set of tappings and the associated group of fingers cross the connections between the other set of tappings and the associated group of fingers. By this means the contact segments of the drum switch are required only to be connected with adjacent segments, as will hereinafter appear, and the otherwise necessary extensive interlacing of connections in the drum between the several contact segments is rendered unnecessary.

The equipments according to the invention may include any desired number of motors, and as shown two motors are employed and the equipment is arranged for series-parallel operation of the motors.

According to a further feature of the invention a control equipment for providing series-parallel operation of two or more electric motors with weak field operation for further acceleration comprises for each of the motors a resistance arranged to be used in many combinations of parts thereof affording single and multiple current paths and serving both as an accelerating resistor and for field shunting, as set forth above, and the switching means comprises a master controller and a servo-operated drum type switch by which the connections of each of the resistors for said combinations are effected, with further switching means and interlocking arrangements whereby circuits carrying the main current are broken by said further switching means before being opened on the drum switch. Said further switching means may be of any suitable form adapted to break current carrying circuits, for example electromagnetic contactor switches.

In carrying out this feature of the invention, the transition between the series and parallel operating conditions of the motors is preferably effected by means of the well known "bridge"

transition system in which case the equipment may be so arranged that no further switching means capable of breaking the main current are necessary, namely other than those normally provided for effecting the transition.

According to a further feature of the invention the transition is initiated by interlock contacts carried on the drum switch. Thus, where a bridge transition is employed, said interlock contacts are arranged to energize the controlling or operating circuit of the well known "J" switch when the drum switch is actuated to the position corresponding to the termination of the series operation. The two motors are then connected directly in series with one another and the accelerating resistors are thereby short-circuited. Interlocks on the "J" switch cause opening of the well known "JR" switch thereby to disconnect the resistors and drum switch from circuit. The interlocks are so arranged that the operation just above described permits movement of the drum switch to the next notch in which the resistors are reinserted in circuit with their respective motors and the two further line switches provided in bridge transition equipments are then closed through suitable interlock contacts. Further movement of the drum switch causes progressive removal of the resistors from the paralleled motor circuits.

With the arrangements according to the invention employing a drum switch the arrangement of said switch is preferably such that in passing to the first weak field notch, namely in removing the resistors from the armature circuits and reconnecting said resistors across the series field windings no current carrying circuits require to be broken, but the alternative circuits to which the currents are transferred are established prior to the opening of the necessary current paths at the drum switch.

In order that the invention may be clearly understood reference will now be made by way of example to the accompanying drawings in which—

Figure 1 is an electrical diagram illustrating one embodiment of the invention employing contactor type switches, Fig. 2 is a sequence chart of the kind well understood by those skilled in the art, showing the operation of the contactors of Fig. 1 in accelerating the motor equipment, and illustrating the principle of resistance notching preferably employed in carrying out the invention.

Fig. 3 comprises a series of circuit diagrams showing the arrangement of the main circuits at various stages in the acceleration of the equipment in accordance with the sequence chart of Figure 2, Fig. 4 is an electrical diagram showing the arrangement of the main circuits in a preferred embodiment of the invention for traction equipment, employing a drum type switch and providing series parallel operation of a pair of motors with field weakening operation under parallel conditions, Fig. 5 is a simplified diagram showing the main circuit arrangement of Figure 4, Figs. 6, 7, and 8 are diagrams similar in nature to Fig. 3 and showing the sequence of switching operations performed on the various positions of the drum switch of Fig. 4 during series, parallel and weak field conditions respectively, and Fig. 9 is a control schematic diagram showing the control circuits for governing the operation of the equipment shown in Fig. 4.

Referring first to Fig. 1, the equipment is illustrated as including two traction motors which are operated permanently in series with one another. The armatures of the two motors are indicated respectively at M1 and M2 with respective series field windings Fd1 and Fd2. The two supply conductors for the equipment are indicated respectively at T1 and T2 being connected with the equipment through respective line switches LS1 and LS2. The accelerating resistance comprises twelve sections r1 to r12 inclusive, the resistance being provided with end connections A and M and intermediate tappings B to L inclusive.

A contactor R1 is provided for connecting the end A of the resistance with the line switch LS1 whilst the other end M of the resistance is adapted to be connected with one end of the pair of field windings Fd1 and Fd2 through a contactor F2. The field windings are also adapted to be connected directly with the line switch LS1 by way of a contactor F1 under certain conditions as will hereinafter appear. A contactor F3 is provided for connecting the end M of the resistance directly with the motor armatures M1 and M2 under certain conditions, as will also hereinafter appear. Further contactors for governing the removal of the resistances from the circuit are provided as indicated at R2 to R17 inclusive. The contactors R4, R7, R10, R13, and R16 are respectively arranged to connect the tapping points D, F, H, J and L of the resistance with a bus wire B1 which is connected with the line switch LS1. The contactors R2, R3, R6, R9, R12 and R15 are arranged to connect the tapping points B, C, E, G, I and K respectively with a second bus wire B2 in which the contactors R5, R8, R11, R14 and R17 are interposed in series with one another, which bus wire B2 is connected between the ends A and M of the resistance. The contactors may be either electromagnetically or electropneumatically actuated and controlled by a suitable control circuit (not shown) conveniently comprising a sequence switch arranged to provide the switching sequence indicated in Fig. 2, the sequence switch being actuated automatically, such as by means of a limit switch. The arrangement of such control circuits will present no difficulty to those skilled in the art and it is therefore deemed unnecessary herein to describe the control circuits. Advantageously the sequence switch may be actuated by an apparatus as claimed in the specification of British Letters Patent No. 451,519. It will be understood that contactors as above described may be replaced by a drum switch or the like providing a similar operation. One such equipment according to the invention will hereinafter be described with reference to Fig. 4.

In the sequence chart of Fig. 2 the contactors which are closed on the various notches or stages of the accelerating operation are indicated by circles, the notches being represented in the top horizontal column of the chart and the switches in the left-hand vertical column. In operation, the line switches LS1 and LS2 are closed on all notches. The contactor F2 is closed on all notches 1 to 65 inclusive and the maximum full field notch FF but is opened on the subsequent notches providing weak field operation as will hereinafter appear. On the first notch the contactor R1 is closed in addition to the line switches LS1 and LS2 and the contactor F2 with the result that power is applied to the motors M1 and M2 through the whole resistance A to M, as shown in Fig. 3 under "notch 1". On the next three notches the contactors R2, R3 and R4 are closed in turn whereby the sections r1, r2, and r3 are progressively removed from the motor circuit. On the fifth notch contactors R5 and R6 are closed to remove the section r4. The contactor R7 is then closed to remove the resistance section r5, whilst on the next notch the contactors R8 and R9 are closed to remove the resistance section r6. On the eighth notch the resistance contactor R10 is closed and the resistance section r7 removed; on the ninth notch the contactors R11 and R12 are closed to remove the resistance section r8, and on the tenth notch the contactor R13 is closed whereby the resistance section r9 is removed. On the eleventh notch contactors R14 and R15 are closed to remove the resistance section r10 and on the twelfth notch contactor R16 is closed whereby the motor armatures and field windings are connected across the supply conductors T1 and T2 through resistance section r12 alone, as shown at "notch 12" in Fig. 3. The contactors R1 to R15 are all opened on the twelfth notch. On the thirteenth notch, indicated at "notch 13" Fig. 3, the contactors R5, R8, R11, R14 and R17 are all closed whereby the bus wire B2 is connected across the ends A and M of the resistance, and the resistance sections r1 to r11 inclusive thereby connected in parallel with the resistance section r12 to effect a further reduction of the resistance, these conditions being indicated at 13 in Fig. 3. The contactors R2, R3, R6, R9, R12 and R15 are then closed in turn to remove the resistance sections r1 to r10 inclusive progressively in six further steps whereby on the nineteenth notch the resistance sections r11 and r12 are left in circuit in parallel with one another, as shown at "notch 19" in Fig. 3. On the twentieth notch the various resistance contactors R2, R3, . . . which were closed on the previous notch are all opened except contactors R15, R16 and R17 and the contactor R1 is again closed to reconnect the end A of the resistance with the line switch LS1 whereby the resistance sections r1 to r10 inclusive are connected in parallel with the sections r11 and r12, as shown at "notch 20" in Fig. 3. Thereafter by a switching sequence similar to that employed between the first to the tenth notch the resistance sections r1 to r9 are progressively removed from the circuit so that on the twenty-ninth notch the three sections r10, r11, r12 remain in parallel with one another. The contactors R1 to R4 inclusive, R6, R7, R9, R10 and R12 are then opened and the contactor R14 closed to connect the resistance sections r1 to r9 inclusive in parallel with the sections r10, r11 and r12, as indicated at "notch 30" in Fig. 3.

From an inspection of the sequence chart of Fig. 2 and the diagrams under "notches 36, 44, 49, 55, 59 and 63" of Fig. 3, it will be seen that sequences similar to those above described are repeated in turn on the remaining sections of resistance so that on the thirty-sixth, forty-fourth, forty-ninth, fifty-fifth, fifty-ninth and sixty-third notches a progressively increasing number of the resistance sections are connected in parallel with one another with the other sections in series with one another, forming a further parallel circuit, which series-connected resistances are progressively removed from circuit during the intermediate notches to leave the last section only in parallel. Finally, on the sixty-fifth notch, the resistance sections r3 to r12 inclusive are all connected in parallel with one another, which in the equipment illustrated provides the lowest value of the resistance. On the next notch FF providing the maximum speed full field operation the contactor R1 is closed in addition to the other contactors whereby the resistance is completely short-circuited through said contactor R1 and the bus wire B2, as indicated under "notch FF" in Fig. 3.

In proceeding to weak field operation the contactor F2 is opened and contactor F1 closed whereby the main motor circuit proceeds from the line switch LS1 through contactor F1 field windings Fd1 and Fd2 and armatures M1 and M2 to the line switch LS2, the contactors R2 to R17 being all opened. Contactors F3 and R1 are however closed, with the result that the whole of the resistance A—M is connected in shunt across the field windings to provide the first weak field notch, that is the minimum value of field weakening. These connections are indicated diagrammatically at "notch WF" in Fig. 3.

The resistance sections r1 to r12, inclusive, are then again progressively reduced in accordance with the sequence above described for the full field operation, the first such resistance reducing notch only being shown in Fig. 2. It will be understood however that the sequence is continued in accordance with the whole or a part of the sequence of the first sixty-five notches to provide progressively increased field diverting operation.

It will be understood that the resistances r1 to r12, inclusive, are graded in order to obtain a desired variation of the resistance during the accelerating period. Usually it will be required that a relatively high initial resistance is available to deal with stand-still conditions, which resistance may be reduced comparatively rapidly on the first one or more notches and then in considerably finer gradations until ultimately the effective resistance has been reduced to a very small part of the initial value, for example one-hundredth, or even very much less. It will be appreciated that the design of the various sections of resistances, in order to obtain any given requirements, will proceed according to methods well known to those skilled in the art.

It will be observed that with the arrangement according to the invention a very large number of values of the resistance is obtainable with a relatively small number of resistance sections and switches. For example with the equipment of Fig. 1, sixty-five different values of resistance are obtained by the employment of only twelve resistance sections and seventeen switches. Furthermore, these resistance sections and switches are employed both for the progressive removal of series resistance from the armature circuit or circuits and for the progressive field weakening.

It will be appreciated that it is not essential to employ all the notches provided by the sequence above described and that some of these notches may be omitted in carrying out the invention. For example, some steps may be omitted during full field operation whilst the same and/or other steps may be omitted during the weak field operation, and similarly, the same and/or other steps may be omitted in the case of an equipment having a plurality of motors arranged for series parallel operation, when the motors are operating in parallel with one another. In general, when the resistances are connected in series with the motor armature or armatures the higher values of resistance will usually be most effective whereas in the field shunting connections the lower range of values will usually be useful.

Referring now to Fig. 4, the armatures of two motors are again indicated at M1 and M2 respectively with associated series field windings Fd1 and Fd2 and are adapted to be connected across the supply conductors T1 and T2 by means of line switches LS1, LS2, LS3 and LS4. The motor M1 is provided with a tapped resistance having sections RR1 to RR5 inclusive whilst the motor M2 is provided with a tapped resistance having sections R1 to R5 inclusive. The equipment includes two contactor switches JR and J for providing transition of the motors from series to parallel operating conditions in accordance with the well-known bridge transition system as will be apparent from the simplified diagram of Fig. 5.

Reverser switches 101 and 102 are provided for the motors M1 and M2 and may conveniently be combined into a single switch which is of the kind adapted to be thrown to one or other of its operative positions by electro-magnetically actuated or controlled means.

The tapping points of the resistance RR1 to RR5 are connected with contact fingers 103-108 inclusive of a drum switch indicated in the conventional manner. This drum switch comprises two mechanically coupled portions 109 and 110 associated with the motors M1 and M2 respectively and having operative positions 1–45 inclusive indicated by the dotted lines in Fig. 4. The portion 110 of the drum switch includes contact fingers 111–116 inclusive which are connected with the tapping points of the resistor R1 to R5. The drum switch further includes contact fingers 117 and 118 co-operating with the segments of the portion 109 and connected together by way of a conductor 118a and through the reverser 101 with the side of the field windings Fd1 remote from the armature M1. A contact finger 119 is connected between the switches LS3 and JR, and a further contact finger 120 is connected with the armature M1 by way of a resistance RR6, the purpose of which will hereinafter appear. Similarly the portion 110 of the drum switch includes contact fingers 121 and 122 connected together over a conductor 122a and through the reverser 102 with the side of the field windings Fd2 remote from the armature M2. A contact finger 123 is connected between the switches LS2 and JR, whilst a further contact finger 124 is connected through a resistance R6, similar in function to resistance RR6, with the armature M2.

It will be observed that the connections between these tapping points and controller fingers are divided into two groups, one group crossing the other, so that one set of alternate tappings, namely a and c, are connected with the first group of adjacent contact fingers 106, 107 and 114, 115 and the other set of alternate tappings, namely b and d with a second group of fingers 104, 105 and 111, 112. By this means the otherwise necessary extensive crossing of conductors between segments of the drum switches is avoided. The segments of the drum may be built up in simple units, each unit comprising all segments which are connected together and the units being fitted together from opposite ends of the drum. The units of segments may conveniently each be constituted by a single simple casting to which contact strips proper may be secured.

The drum switch is provided with two sets of auxiliary or interlock contacts 125 and 126 forming part of the control circuits for the equipment and the function and operation of which will hereinafter appear in the description of Fig. 9, in which these interlock contacts are shown in the usual schematic manner.

The coils of overload relays are connected at OL2 and OL1 respectively, whilst the operating coil of a limit switch for governing the accelerating operation of the equipment is indicated at 127.

The drum switch is actuated by a servo motor device (not shown) controlled by the contacts of the limit switch so as to allow movement of the drum switch when the armature current of the motors is below a predetermined value. In the example of the invention being described this servo motor device is arranged as set forth in the specification of British Letters Patent No. 451,514. This servo motor device comprises a piston subjected to a liquid pressure obtained by the application of air pressure to the liquid. The movement of the piston is controlled by a valve which governs the flow of liquid to the piston whilst a valve is provided for controlling the application of said air pressure, said valves being provided with operating coils connected as hereinafter described with reference to Fig. 9. A second piston is provided for returning the drum and the first said piston to the initial position upon application of air pressure to the second piston. This piston is governed by a valve herein termed the "off" valve which normally connects the cylinder in which said piston operates with the air pressure source but when the operating coil for said valve is energized said cylinder is vented to atmosphere. A relief valve operated by an electromagnetic coil is provided for allowing relatively quick return movement of the plunger as described in the earlier specification aforesaid. The operating coils of the two last mentioned valves are connected in the control circuit as will hereinafter be described.

Referring now to Fig. 9, the control circuit is energized from conductors 128 and 129. The circuits are governed by a master controller indicated generally at MC having the usual deadman's-handle contacts indicated at 130, an accelerating drum 131 having an off position O and operative positions 1–5 inclusive and a reverser drum 132.

The conductor 128 is connected with the equipment through the usual control governor 133 from whence the circuit branches on the one hand to the trip and reset push-button switches 134 and 135 respectively, and on the other hand over conductor 136 to the dead-man's-handle contacts 130. From the contacts 130 a circuit proceeds to a contact finger 136 on the reverser drum 132 whilst the contacts 130 are also connected with a contact finger 137 co-operating with the contact segments of the drum 131. The drum 132 is arranged alternatively to energize forward and reverse wires 138 and 139 from the contact finger 136 accordingly as the drum is actuated to the forward or reverse position. The accelerating drum 131 co-operates with five further contact fingers connected respectively with conductors 140—144 respectively. The drum 131 is arranged to energize these conductors successively in movement from the off to the fifth position. The trip and reset switches 134 and 135 are arranged to energize conductors 145 and 146 respectively, the conductor 146 including contacts 147 closed by the drum 131 only in the off position of the latter. A further conductor 148 is connected with the same side of the control circuit supply source as is the conductor 128.

The various conductors 138—146 inclusive and 148 are connected at a train line connection box 149 with a train line cable (not shown) the equipment being arranged for multiple unit operation. From the train line connection box the wires 138—146 proceed over a cable 150 to a control cut-out switch 151 and thence through a control junction box 152 to a cable 153.

The forward and reverse wires 138 and 139 on emerging from the cable 153 are connected respectively with the operating coils 154 and 155 for actuating the reverser to the forward and reverse positions respectively. The reverser carries interlock contacts 156 arranged when the reverser has been thrown to the position corresponding to that one of the wires 138 and 139 which is energized, to cause energization of a conductor 157 from the energized conductor 138 or 139. The conductor 157 is connected with the operating or control coils OCLS1 and OCLS4 of the line switches LS1 and LS4, the circuit proceeding through contacts 158 of a no-volt no-current relay and an interlock contact 159 carried by the drum switch (Fig. 4) and closed only when said switch is in the off position. The last mentioned contacts are shunted by interlock contacts 160 carried by the line switch LS1 and closed only when said switch is open. The circuit of the operating coils OCLS1, OCLS4 is completed to the conductor 129 by way of over-load relay contacts 161. The conductor 140 proceeds by way of conductor 140a, interlock contacts 162 carried by the line switch LS3 and closed only when the latter is in the open position, and interlock contacts 163 carried by the switch J and opened when the latter is in the closed position, to the operating coil OCJR of the switch JR.

The conductor 140 also proceeds by way of a branch 140b through interlock contacts 164 carried by the line switch LS4 and closed when the latter is in the closed position to a contact finger 165 co-operating with interlock contact segments 125 of the drum switch. The interlock contacts 164 are shunted by contacts 166 carried by a tripping element by which the overload relays are operated to trip the line switches upon energization of the conductor 145 from the trip pushbutton 134, the conductor 145 including an operating coil 167 for actuating the said tripping element when said coil is energized.

A conductor 140c branched from the conductor 140a is connected with operating coils 168 and 169 of the off and release valves of the servo motor. Thus, when the coil 168 is energized the return cylinder of the servo motor is vented to atmosphere whilst the coil 169 when energized closes the relief valve in the fluid part of the servo motor. The operating coil of the valve by which air pressure is applied to the liquid system of the servo motor is indicated at 170, this valve being hereinafter termed the "on" valve and being opened when the coil 170 is energized. The energization of this coil is effected from a contact finger 171 of the interlock contacts 125 of the drum switch. These interlock contacts are arranged so that the finger 171 is energized either from the finger 165 or when the drum occupies its first position from a contact finger 172 connected with the conductor 148.

The interlock contacts 125 include further segments which in the series and parallel ranges of movement of the drum switch connect contact fingers 173 and 174 respectively with the finger 165 and thus with the conductor 140b. The finger 173 is connected with the operating coil OCJ of the switch J by way of interlock contacts 175 carried by the line switch LS3 and closed only when the latter is in the open position. The contact finger 174 is connected with the operating coils OCLS3 and OCLS2 of the line switches LS3 and LS2, the circuit including interlock contact 176 carried by the switch JR and closed only when the latter is in the open position and contacts 177 of the no-volt no-current relay. The coil of the feed valve of the servo motor device is indicated at 178 having connected in circuit therewith the contacts 179 of the current limit switch which contacts are opened when the armature current of the motors rises above a predetermined value. The circuit of the coil 178 is adapted to be energized by way of the interlock contacts 126 from the conductors 141 to 144 inclusive in the manner hereinafter described. The conductor 141 is connected with a contact finger 180 connected by the segments 126 with contact fingers 181 and 182 when the drum switch occupies a position within the range of series operating conditions. The finger 181 is engaged by its co-operating contact segment throughout the complete range of movement of the drum switch, whilst the finger 182 is engaged only in the series positions. The circuit of the feed coil 178 is connected with the finger 181 by means of interlock contact 183 carried by the switch JR and closed only when the latter is in the open position.

The conductors 142, 143 and 144 are each connected with the operating coils of respective relays 184, 185 and 186 which, when their coils are energized, close their contacts to connect the conductors 142, 143 and 144 with contact fingers 187, 188 and 189 respectively of the interlock contacts 126. The provision and arrangement of said relays 184, 185 and 186 forms the subject matter of British application No. 15,536/36 and it is to be understood that no claim is herein made to such arrangements. The contact segments co-operating with the fingers 187, 188 and 189 are arranged so that the finger 187 is connected with the finger 181 when the drum switch occupies a position providing parallel operating conditions of the equipment. The finger 188 is connected with finger 181 when the drum occupies the first portion of its range of movement providing weak field operation and the finger 189 is connected with finger 181 when the drum switch occupies a position within the second portion of its range of movement providing weak field operation, that is its final range of movement.

The interlock contacts 126 of the drum switch comprise further fingers 190, 191 and 192 and segments which connect the fingers 190 and 191 together when the drum switch reaches the parallel position and the contact fingers 191 and 192 together when the drum switch reaches the final position. Contact finger 190 is connected with the conductor 193 to which the finger 192 is connected by way of interlock contacts 194 carried by the line switch LS4 and closed only when said line switch is closed. A test plug or the like is provided at 195 whereby the conductors 193 and 196 to which the contact finger 191 is connected, may be short-circuited under certain circumstances, referred to hereinafter, the circuit of the conductors 193 and 196 through the interlock contacts 126 of the drum switch being employed for test operation, to be described hereinafter.

The conductor 146, which is adapted to be energized by operation of the reset push-button 135, is connected with the resetting coil 190 of the over-load relay, the circuit including interlock contacts 198 forming part of the contacts 125 and closed only when the drum switch occupies the "off" position.

In the operation of the above described equipment, assuming the reverser drum 132 (Fig. 9) to be actuated to an operative position, the corresponding forward or reverse wire 138 or 139 will be energized, thereby to energize the appropriate coil 154 or 155 to throw the reverser 101 and 102 (Fig. 4) in the required direction. The conductor 157 is thereby energized and through the no-current relay contacts 158 and the interlock contacts 159 of the drum switch, which is in its first position, referred to as the initial or "off" position, said conductor causes energization of the coils OCLS1 and OCLS4, whereby the line switch LS1 and LS4 (Figs. 4 and 5) are closed and the equipment thus connected with the supply conductors T1 and T2. Assuming now that the accelerating drum 131 of the master controller is actuated to an operative position the conductor 140 becomes energized and its branch 140a energizes the coil OCJR to close the JR switch, the interlock contacts 162 and 163 being closed at this time since the line switch LS3 and the switch J are open. Consequently in this position of the master controller the main power circuit proceeds from supply conductor T1 through the coil OL1 of the overload relay associated with the motor M1, through the line switch LS1, motor armature M1, reverser 101 and series field winding Fd1, to the contact finger 118 of the drum switch. In the initial or "off" position of the drum switch which is occupied by the latter at this time the finger 118 is connected with the finger 108 by the segments of the drum and the circuit proceeds through the five resistance sections RR5 to RR1 inclusive to the contact finger 105 which is engaged by a contact segment connected with the finger 119. From the finger 119 the circuit proceeds through the JR switch to the contact finger 123 of the portion 110 of the drum switch, through the segments of the latter to the finger 114, and thence by way of the resistance sections R2, R3, R4 and R5 to the contact finger 116 which is connected through the drum segments with the contact finger 122. The circuit continues through the reverser 102 and series field winding Fd2 to the armature M2 and thence by way of line switch LS4, series coil 127 of the limit switch and the coil OL2 of the overload relay associated with the motor M2 to the supply conductor T2. The two motors are thus connected directly in series across the supply conductors with nine sections of the two resistances in series therewith the arrangements of said resistance being indicated at "notch 1" in Fig. 6. The equipment is thus connected for minimum speed operation and unless the master controller is actuated to a further position no removal of the accelerating resistances takes place.

In the first or off position of the drum switch the interlock contacts 125 connect the contact fingers 172 and 171 together to energize the coil 170 from the conductor 148. Air pressure is thus applied to the liquid system of the servo motor in readiness for movement of the drum switch by energization of the coils 168 and 169 of the "off" and relief valves and the coil 178 of the feed valve. By this means the time otherwise necessary for raising the air in the system to the operating pressure is avoided. The coils 168 and 169 are energized from the conductor 140c immediately the controller drum 131 is actuated to an operative position to energize conductor 140 as above described. Assuming now that the master controller is operated to any one of its operative positions 2–5 inclusive conductor 141 is energized from the drum 131, whereby the contact finger 182 of the interlock contacts 126 of the drum switch is energized from the finger 180 through the associated segments. The feed coil 178 of the servo device for the drum switch thus becomes energized under control of the limit switch 179 and movement of the drum switch to its second position is thus permitted thereby to maintain the armature current of the motors at the value determined by the setting of said limit switch. On the second and subsequent positions of the drum switch the finger 171 of the interlock contacts 125 is disconnected from the finger 172 and connected with finger 165 whereby the energization of the coil 170 is transferred from the conductor 148 to the conductor 140b so that subsequent de-energization of conductor 140b will result in return of the drum switch to the first position as will hereinafter be described. Under control of the limit switch contacts 178 the switch will now move forward until, assuming the accelerating drum 131 occupies the second position so that conductors 142, 143 and 144 are not energized, the finger 180 is disengaged by its associated segment, namely, at the position indicated by the chain line designated "series" in Figs. 4 and 9, which is the sixteenth notch of the sequence as indicated in Fig. 4, and provides the full series operation. Under these conditions the circuit of the feed coil 178 becomes broken and further movement of the drum switch is prevented.

Figure 6:
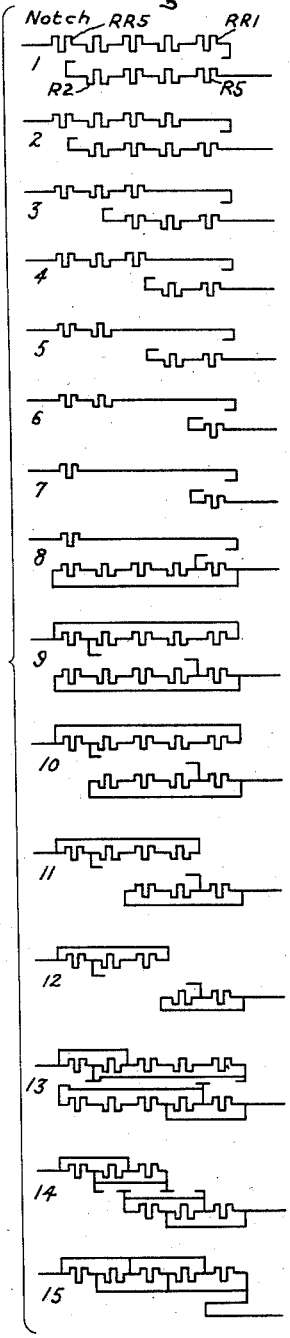
Figure 7:
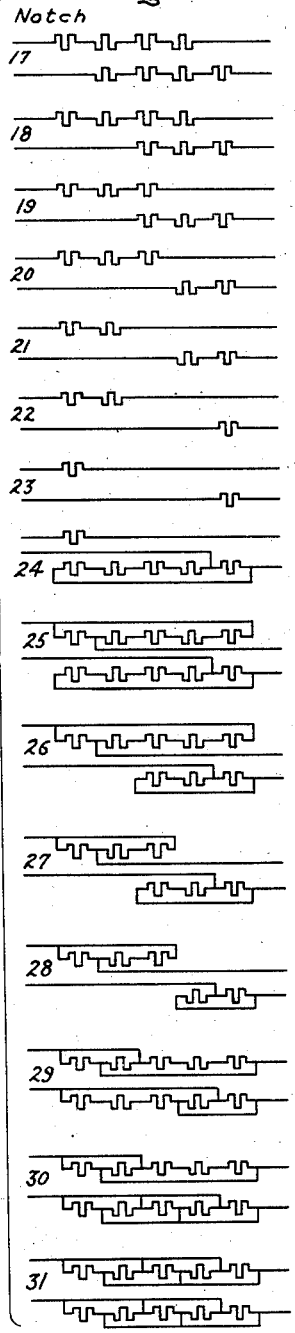
Figure 8:
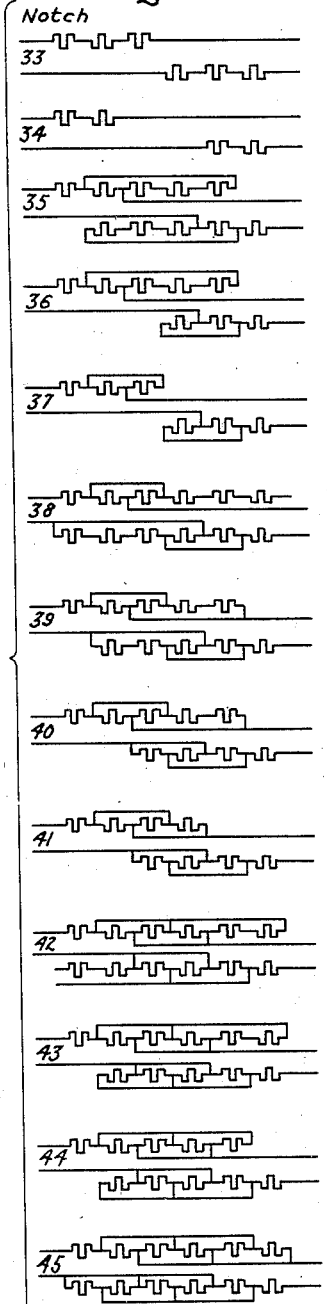

The arrangement of the resistance sections R1—R5 and RR5 to RR1 utilized on the series notches 1—15 of the equipment are shown in Fig. 6 and it will be seen that the removal of resistances proceeds generally in accordance with the principle described with reference to Figs. 1, 2 and 3, but a considerable number of the possible combinations of the resistance sections are omitted. The relatively great number of notches indicated in Fig. 2 are not required in the equipment being described. Furthermore the series operation comprises only about one-third of the complete range of notches. It will be noted that in certain cases the angular distance between adjacent notches as indicated by the scale of degrees included in the centre of Fig. 4 has been increased, for example, between the twelfth and thirteenth notches. By this means it is impossible for the power connections to proceed from the twelfth to the thirteenth combination without passing through intermediate connections provided by the position indicated at 12a. This arrangement furthermore ensures that even with the finger contacts badly adjusted incorrect switch operations at the drum switch are not possible.

It is to be noted that on the fifteenth notch the finger 121 (Fig. 4) is connected directly with the finger 123 whereby the whole of the resistances R1 to R5 are removed from circuit leaving only the resistances RR1 to RR5 connected all in parallel with one another as shown at notch 15, Fig. 6. On the sixteenth notch the conductor 140b (Fig. 9) which is energized by the conductor 140 is connected through the fingers 165 and 173 of the interlock contacts 125 with the coil OCJ of the switch J, the line switch LS3 being at this time open and the interlock contacts 175 consequently closed.

By the closure of the switch J the motors are connected directly in series with one another and the circuits previously made on the drum switch may thus be broken without any arcing occurring at the latter.

Assuming that the accelerating drum 131 (Fig. 9) now occupies the third or subsequent position the conductor 142 is energized to energize the coil of relay 184 which closes its contacts to cause energization of finger 187 of the interlock contacts 126, said finger 187 thus becomes connected (in the full series position) with the finger 181 and since the JR switch has been opened upon de-energization of its coil OCJR due to opening of the interlock contacts 163 resulting from closure of the switch J the finger 181 is connected through the interlock contacts 183 with the feed coil 178. The interlock contacts 163 are made sufficiently long as indicated to ensure that the switch JR shall not be opened until the switch J has closed. Movement of the drum switch may now proceed under control of the limit switch contacts 179. This further movement causes, on the seventeenth notch of the drum switch, the finger 174 to be energized by way of finger 165 and conductor 140b. Energization of finger 174 results in energization of coils OCLS3 and OCLS2, since the interlock contacts 176 carried by the switch JR are closed as the latter is now open, and the line switches LS3 and LS4 are thereby closed. In its movement from the sixteenth to the seventeenth notch the drum switch has rearranged the connections of the accelerating resistances so that four sections of each of the latter are now included in circuit with each motor respectively. The closure of line switch LS3 causes opening of the interlock contacts 175 whereby the circuit of the coil OCJ is broken and the switch J thereby opened and the transition completed.

The circuit for the motor M1 thus now proceeds (Fig. 4) from supply conductor T1 through line switch LS1, armature M1, reverser 101 and field winding Fd1 to contact finger 118, through drum switch segments and resistance sections RR5, RR4, RR3 and RR2 to finger 106. From this finger the circuit proceeds through the drum switch segments to the finger 119, line switch LS3 and to the supply conductor T2.

The circuit for the motor M2 proceeds from the supply conductor T1 through line switch LS2, contact finger 123, drum switch segments, finger 114, resistances sections R2, R3, R4, R5, to finger 116. The drum segments connect finger 116 with finger 122 from whence the circuit continues through reverser 102 and field winding Fd2 to the armature M2, line switch LS4 and supply conductor T2. These circuit conditions of the resistances are represented at "notch 17", Fig. 7.

It will be noted that the finger 121 is connected with the finger 123 completely to remove resistances R1—R5 from circuit immediately after the fifteenth notch, and that both fingers 121 and 117 remain connected with fingers 123 and 119 respectively until well through the transition. By this means a large angular movement is obtained in which the drum may be stopped in the event of switch J failing to close through mischance without sacrificing the desired creepage distance between such segments as those engaging with finger 106 which on the sixteenth and seventeenth notches are connected to segments of opposite polarity. As will be seen from an inspection of the segments 110 and 109 in Fig. 4 the several contact fingers are arranged to be disengaged by the associated segments one at a time so that the torque required to turn the drum in the reverse direction is not excessive as would be the case if it were necessary to raise a considerable number of fingers simultaneously.

Under control of the limit switch contacts 179 the movement of the drum switch proceeds forward from the seventeenth notch to the thirty-second notch providing full parallel operation of the equipment. The sequence by which the resistances are removed from the motor circuit will be apparent from inspection of Fig. 4, and are shown in detail in Fig. 7. It will be seen that the sequence again follows the principle employed in the arrangement of Figs. 1, 2 and 3, the notches employed according to Figs. 4 and 7 being, however, those most useful for the acceleration of the equipment during the parallel operating conditions of the two motors and the resistance being notched out of the two motor circuits alternately. On the thirty-first notch the resistance sections RR1 to RR5 are all connected in parallel with one another in series with the motor M1, whilst the resistance sections R1 to R5 inclusive are similarly all connected in parallel with one another in series with the motor M2, these conditions providing the minimum value of the resistances and the penultimate notch of the parallel operation.

On the thirty-second or full parallel notch the contact fingers 117 and 121 become again connected directly by the drum segments with the fingers 119 and 123 respectively and thereafter, namely between the thirty-second and thirty-third notches, the various contact fingers 103 to 118 inclusive, 111 to 116 inclusive and 1 to 2 are disengaged by the segments in preparation for the reconnection of the resistance sections across the field windings.

Thus on the thirty-second notch each of the motors is connected directly across the supply conductors T1 and T2 by way of a circuit which for the motor M1 proceeds through line switch LS1, motor armature M1, reverser 101, field winding Fd1, conductor 118a, finger 117, drum segments, finger 119, line switch LS3, whilst the circuit for the motor M2 proceeds through line switch LS2, contact finger 123, drum switch segments, finger 121, conductor 122a, reverser 102, field winding Fd2, armature M2, and line switch LS4. If the master controller occupies its third position corresponding to full parallel operation, no further movement of the drum switch can occur since on this notch the finger 187 is disengaged by its associated contact segments of the interlock contacts 126 and the circuit of the feed coil 178 is thus broken at said interlock contacts since the conductors 143 and 144 are not energized unless the master controller occupies the fourth or fifth positions.

Assuming now that the controller occupies the fourth position, the conductor 143 becomes energized whereby the relay 185 is actuated to close its contacts and energizes the contact finger 188 whereby the energization of the circuit of the feed coil 178 is continued and further movement of the drum switch is possible under control of the limit switch contacts 179. The drum switch is thus actuated to its thirty-third position in which the finger 108 becomes connected with the finger 120, the connection of finger 108 with finger 118 having been terminated immediately after the full parallel position. The upper end of the resistances RR5 to RR1 inclusive are thus connected between the armature M1 of the associated field winding Fd1. The finger 104 is connected with the finger 119 and also with the finger 117 and thus to the other end of the field winding. Consequently the resistance sections RR5, RR4 and RR3 are connected in series across the field winding Fd1 to provide the first weak field operation.

Similarly in the thirty-third position the contact finger 124 is connected with the contact finger 116, whereby the lower end of the resistances R1 to R5 inclusive is connected between the armature M2 of the field winding Fd2. The finger 112 is connected with the fingers 123 and 121 whereby the resistance sections R3, R4 and R5 are connected across the field winding Fd2; the arrangement of the resistance sections under these conditions is shown at 33 in Fig. 8.

It will be noted that the connection of the accelerating resistances across the respective field winding is made by way of the resistances RR6 and R6 respectively. These resistances RR6 and R6 are of comparatively low value and are employed in order to adjust the resistance of the two shunt circuits so that the same degree of field weakening is obtained for both motors and thereby to compensate where necessary for differences in the cable and contact resistances of the parts of the equipment associated with the two motors. These additional resistances may be omitted where not required.

Under control of the limit switch contacts 179 movement of the drum may proceed to the thirty-eighth position which corresponds with the position 4 of the master controller. At this position of the drum the segments of the interlock contacts 126 disengage the finger 188 and the circuit for the feed coil 178 is broken at said interlock contacts. If, however, the accelerating drum 131 is actuated to the fourth position the said circuit is maintained through conductor 144, contacts of relay 186, which will be closed and contact finger 189, so that under control of the limit switch the movement of the drum switch may proceed to the forty-fifth and final position providing the maximum obtainable amount of field weakening.

The movement of the drum switch may be terminated at any desired point by return of the accelerating drum 131 of the master controller to the previous operative position, whereby the interlock contacts 126 will disconnect the circuit of the feed coil 168.

Upon return of the accelerating drum 131 to the "off" position the forward or reverse wire 138 or 139, and the conductor 140 are de-energized. The coils OCLS1, OCLS4, OCLS3 and OCLS2 of the four line switches are thereby de-energized and said switches open to disconnect the equipment from the supply conductors. The de-energization of conductor 140 results in the de-energization of conductor 140b and thereby through the interlock contacts 125 the feed coil 170 is de-energized, whilst the off coil 168 and the release coil 169 are also de-energized due to the de-energization of conductor 140c. The de-energization of coil 168 vents the servo motor operating plunger to atmosphere whilst the de-energization of the coil 169 opens the release valve permitting free flow of the liquid of the servo motor. The de-energization of coil 170 applies air pressure to the return piston of the servo motor device whereby the drum switch is returned to the "off" position. It will be seen that re-application of power to the motors is prevented until the drum position has been returned completely to the "off" position since the interlock contacts 169 in circuit with the operating coils of the line switches LS1 and LS4 are opened upon opening of the line switch LS1 as above described and the same circuits may only be re-energized upon closure of the interlock contacts 159 which are closed in the "off" position of the drum. Furthermore, energization of the coil 170 from the conductor 140b cannot be again effected until the closure of the interlock contacts 164 resulting from closure of the line switch LS4. Due, however, to the arrangement of the interlock contacts 125 in association with the finger 172 the coil 170 is energized from the conductor 148 when the drum switch reaches its initial or "off" position thereby to energize valve 170 and re-apply air pressure to the servo device in readiness for a further accelerating operation as hereinbefore described. The normal "off" position conditions are thus re-established and acceleration of the equipment may proceed as hereinbefore described. Just before the drum switch reaches the "off" position a restriction is introduced into the release valve by the movement of the piston so as to cushion movement of the drum at the end of the return movement.

In the event of an overload on the motors the contacts 161 of the overload relays are opened whereby to de-energize the coils OCLS1, OCLS4, OCLS3 and OCLS2. The four line switches are thus opened to disconnect the motor equipment from the supply conductors as above described. The opening of the LS4 line switch de-energizes the conductor 149b due to the opening of interlock contacts 164 and air pressure is removed from the operating piston of the servo motor by de-energization of the coil 170. The drum switch is thus stopped with no pressure on either piston but with the feed valve still open due to the energization of feed coil 178. In order to reset the overload trip the push button 135 must be operated to energize conductor 146 and thereby reset coil 197. The circuit of conductor 146 includes however the interlock contacts 147 on the accelerating drum 131 and the interlock contacts 198 of the drum switch, which interlock contacts are closed only when the master controller and the drum switch occupy their respective "off" positions. In order to effect this reset operation it is thus necessary for the master controller to be returned to the "off" position and for the drum switch to follow to its "off" position.

In the case of an interruption of the supply to the equipment the contacts 158 and 177 of the no-load no-current relays are opened, whereby to de-energize the coils OCLS1, OCLS4, OCLS3 and OCLS2 and the four line switches are again opened as in the case of an overload, whilst the movement of the drum switch is similarly stopped. Upon reinstatement of the supply voltage the line switches cannot be reclosed until the master controller and drum switch are returned to their "off" positions as in the case of an overload.

During accelerating operation the interlock contacts 126 connect the fingers 190 and 191 together when the drum switch reaches the full parallel or thirty-second position and since under these conditions the interlock contacts 194 of the line switch LS4 are closed the conductors 196 and 193 are connected together. The conductors 193 and 196 of the one or several equipments operating together in multiple unit are all connected across the supply conductors in series with one another and with a suitable signal device located in the motorman's cab whereby the circuit of said signal device will be closed when all the equipment of the train reaches the full parallel position.

A further indication is given by said signalling device when all the drum switches of the train reach the final position in which the fingers 191 and 192 are connected together at the interlock contacts 126.

In order to test the operation of the equipment the trip push button 134 may be actuated to energize conductor 145 and the coil 167 of the trip element. The line switches are thus tripped open and the master controller may be actuated to its fifth position whereby movement of the drum switch to its final position will take place rapidly since the limit switch contacts 179 remain closed due to the fact that no power current flows since the line switches are open. The interlock contacts 164 of the now open line switch LS4 are under these conditions short-circuited by the contacts 166 operated by the trip element coil 167, whereby the energization of conductor 140b and coil 170 is maintained. When all the equipments of the train reach the final position the contact fingers 191 and 192 are connected together in the several equipments to complete the circuit of the said signalling means. Should such signal not be obtained the test plugs 195 of each of the several equipments may be short-circuited in turn when the signal will be obtained upon short-circuit of the test plug associated with the faulty equipment or equipments, that is to say each equipment in which the drum switch has not been actuated to the final position.

It will be appreciated that the several arrangements according to the invention possess the advantage of simplicity and employ only apparatus of well established kind.

It is to be understood that various modifications may be made in the arrangements above described without departing from the scope of the invention.

I claim:

1. In an electric motor controller, a plurality of resistance sections, switching means for controlling the connection of said resistance sections in circuit with a motor, and means for sequentially controlling said switching means to connect said resistance sections initially in series and for thereafter progressively excluding said resistance sections from the circuit of the motor with the exception of one section, connecting said excluded sections in series with each other and in parallel with said remaining section, and then excluding said series connected sections with the exception of one section, this operation being repeated until said sections are connected in parallel with one another in the circuit of the motor.

2. In an electric motor controller, a plurality of resistance sections, a contact drum for controlling the connection of said resistance sections in circuit with a motor, contact members on said drum for initially connecting said resistance sections in series and for thereafter progressively excluding said resistance sections from the circuit of the motor with the exception of one section, connecting said excluded sections in series with each other and in parallel with said remaining section, and then excluding said series connected sections with the exception of one section, this operation being repeated until said sections are connected in parallel with one another in the circuit of the motor.

3. An electric motor control system comprising in combination with a motor provided with a series field winding, a plurality of resistance sections, a contact drum for controlling the connection of said resistance sections in circuit with said motor, contact members on said drum for initially connecting said resistance sections in series with said motor and for thereafter progressively excluding said resistance sections from the circuit of said motor with the exception of one section, connecting said excluded sections in series with each other and in parallel with said remaining section, then excluding said series connected sections with the exception of one section, this operation being repeated until said sections are connected in parallel with one another in the circuit of said motor, and contact members on said drum for thereafter excluding all of said resistance sections and for connecting certain of said resistance sections in series with each other in parallel with said field winding for further field weakening.

4. An electric motor control system comprising in combination with a motor, a resistance comprising a plurality of series connected sections, a bus conductor, a series of tapping connections from said resistance to said bus conductor, a switch in each of said tapping connections, switches in said bus conductor between the points of connection therewith of said tapping connections, a second bus conductor, a second set of resistance tappings intercalated with said first set connected to said second bus conductor, a switch in each of said tapping connections, and control means for said switches for connecting one of said bus conductors to a source of electrical supply and the other of said bus conductors to said motor to thereby connect said resistance in series with said motor, and to thereafter effect a succession of steps of alternate tap-stepping and interconnection of tappings to connect gradually said resistance sections in parallel with each other.

5. An electric motor control system comprising in combination with a motor, a resistance comprising a plurality of series connected sections, a bus wire, a series of tapping connections from said resistance to said bus wire, a switch in each of said tapping connections, switches in said bus wire between the points of connection therewith of said tapping connections, a second bus wire, a second set of resistance tappings intercalated with said first set connected to said second bus wire, a switch in each of said tapping connections, and control means for said switches for connecting one of said bus wires to a source of electrical supply and the other of said bus wires to said motor to thereby connect said resistance in series with said motor, and to thereafter effect a succession of steps of alternate tap-stepping and interconnection of tappings to gradually connect said resistance sections in parallel with each other, said switches being constituted by a drum controller and said two bus wires being constituted by connections between suitable contact segments in the drum of said controller.

6. An electric motor control system comprising in combination with a motor provided with a series field winding, a resistance comprising a plurality of series connected sections, a bus wire, a series of tapping connections from said resistance to said bus wire, a switch in each of said tapping connections, switches in said bus wire between the points of connection of said tapping connections, a second bus wire, a second set of tappings intercalated with said first set connected to said second bus wire, a switch in each of said tapping connections, connections between the ends of said resistance and said first bus wire, switches for selectively connecting one end of said resistance to each side of said field winding, a switch connecting said second bus wire to one side of said field winding, a switch connecting the other end of said resistance to said second bus wire, means for controlling said switches to connect said resistance in series with the armature of said motor and then to gradually connect the sections of said resistance between said tappings in parallel with each other in circuit with said motor, said resistance sections being first excluded with the exception of one, then reconnected in series with each other in parallel with said one, then excluded with the exception of one section, this operation being repeated until said sections are connected in parallel, and means for controlling said switches to exclude said resistance from the armature circuit of said motor, then connect said resistance in parallel with said series field winding and thereafter progressively exclude at least a portion of said resistance.

7. An electric motor control system comprising in combination with a motor provided with a series field winding, a resistance comprising a plurality of series connected sections, a drum controller for controlling the connection of said resistance in the circuit of said motor, said controller being provided with two groups of adjacent contact fingers, connections between said groups respectively and two intercalated sets of said tappings on said resistance between said sections, the connections between each set of tappings and its associated fingers crossing the connections between the other set of tappings and its associated fingers, and contact members on said drum for connecting said resistance in series with said motor and for thereafter effecting a succession of steps of alternate tap-stepping and interconnection of tappings to connect gradually the sections of said resistance in parallel with each other in the circuit of said motor.

8. An electric motor control system comprising in combination with a motor provided with a series field winding, a resistance comprising a plurality of series connected sections, a drum controller for controlling the connection of said resistance in the circuit of said motor, said controller being provided with two groups of adjacent contact fingers, connections between said groups respectively and two intercalated sets of said tappings on said resistance between said sections, the connections between each set of tappings and its associated fingers crossing the connections between the other set of tappings and its associated fingers, and contact members on said drum for initially connecting said resistance in series with said motor and for thereafter progressively excluding the sections of said resistance between said tappings from the circuit of said motor with the exception of one section, connecting said excluding sections in series with each other and parallel with the remaining section, and then excluding said series connected sections with the exception of one section, etc., until said sections are connected in parallel with one another in the circuit of said motor.

9. The combination in a series parallel control system for two electric motors provided with series field windings, two sets of resistance sections, one for each motor, rotary switching means for progressively controlling the energization of said motors and the connections of said resistance sections so as to initially connect said motors in series with each other, and said sets of resistances in series with each other in circuit with said motors, the resistance sections of each set being connected in series with each other, for thereafter excluding said sections from said sets with the exception of one section in each set, then connecting the excluded sections of each set in series with each other in parallel with the remaining section and excluding said series connected sections from said sets with the exception of one, this operation being repeated until said sections of each set are connected in parallel with each other, and rotary switching means for then connecting said motors in parallel with each other with certain of the resistance sections in each set included in the circuit with each motor in series with each other, for progressively connecting the resistance sections in each set in parallel with each other by the series parallel method previously described, and for thereafter excluding said resistances completely from the circuit of each motor and then connecting the resistance sections in said sets in series with each other and in parallel respectively with said field windings.

10. The combination in a series parallel control system for two electric motors provided with series field windings, two sets of resistance sections, one for each motor, a contact drum for progressively controlling the energization of said motors and the connections of said resistance sections, contact members on said drum for initially connecting said motors in series with each other and said sets of resistances in series with each other in circuit with said motors, the resistance sections of each set being connected in series with each other, contact members on said drum for thereafter excluding said sections alternately from said sets with the exception of one section in each set, then connecting the excluded sections of each set in series with each other in parallel with the remaining section and excluding said series connected sections alternately from said sets with the exception of one, this operation being repeated until said sections of each set are connected in parallel with each other, contact members on said drum for then connecting said motors in parallel with each other with certain of the resistance sections in each set in series with each other included in the circuit with each motor, contact members on said drum for thereafter progressively connecting the resistance sections in each set in parallel with each other by the series parallel method previously described, contact members on said drum for thereafter excluding said resistances completely from the circuit of each motor and then connecting the resistance sections in said sets in series with each other and in parallel respectively with said field windings.

WILLIAM TRAIN GRAY.